(12) United States Patent
Shirataki et al.

(10) Patent No.: US 7,040,469 B2
(45) Date of Patent: May 9, 2006

(54) ONE-WAY CLUTCH APPARATUS (75) Inventors: Hirobumi Shirataki, Fukuroi (JP);
Hirofumi Ogata, Kakegawa (JP);
Hideharu Ohishi, Shizuoka (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/814,652

(22) Filed: Apr. 1, 2004

(65) Prior Publication Data

US 2005/0040001 A1     Feb. 24, 2005

(30) Foreign Application Priority Data

Apr. 3, 2003   (JP) ............................. 2003-100717

(51) Int. Cl.
*F16D 41/07*   (2006.01)
(52) U.S. Cl. ..................... 192/45; 192/110 B
(58) Field of Classification Search ............... 192/45, 192/110 B; 188/82.84
See application file for complete search history.

(56) References Cited

U.S. PATENT DOCUMENTS

| | | | | |
|---|---|---|---|---|
| 3,031,052 A | * | 4/1962 | Blinder ........................ | 192/45 |
| 3,031,053 A | * | 4/1962 | Sauzedde et al. ............. | 192/45 |
| 5,667,046 A | * | 9/1997 | Stanton et al. ................ | 192/45 |
| 6,044,945 A | * | 4/2000 | Muramatsu .................. | 192/45 |

FOREIGN PATENT DOCUMENTS

JP       2003-83365       3/2003

* cited by examiner

*Primary Examiner*—Saul Rodriguez
(74) *Attorney, Agent, or Firm*—Miles & Stockbridge PC (57) ABSTRACT

A one-way clutch apparatus with torque transmission elements and biasing members in concave cams on one of the inner and outer races has a retainer rotatable in a circumferential direction relative to the one race, has circumferential grooves on the one race, and has block bearings between the races with radial projections that move circumferentially in corresponding grooves.

8 Claims, 11 Drawing Sheets

ONE-WAY CLUTCH APPARATUS

This application claims the benefit of Japanese Patent application No. 2003-100717 which is hereby incorporated by reference.

BACKGROUND OF THE INVENTION

1. Field of the Invention

The present invention relates to a one-way clutch apparatus to be incorporated in an automatic transmission or the like of a car.

2. Related Background Art

An automatic transmission of a car generally comprises a planetary gear transmission mechanism of about three to five speed levels, in addition to a torque converter serving as a fluid coupling, so as to change speed by properly fixing or releasing the constituent elements of the planetary gear transmission mechanism (such as a sun gear or a planetary gear) by use of frictional engagement means such as a clutch or a brake. As the frictional engagement means to be incorporated in an automatic transmission, a multiple disc wet type having friction plates and separator plates alternately arranged therein is employed, except in some band type brakes. Pressure oil from a transmission control oil pressure circuit is used for bringing both plates into pressure contact with each other (that is, frictional engagement). As such frictional engagement means, a member that incorporates a one-way clutch therein to facilitate transmission control by freely rotating a gear shaft or the like in one rotational direction is employed in some of the automatic transmissions.

Recently, it is considered to employ a roller type one-way clutch apparatus for an automatic transmission in which rollers are interposed between an inner race and an outer race as torque transmission members and concave cams are formed on the inner race side or the outer race side. The roller type one-way clutch apparatus comprises springs for urging the respective rollers toward the direction of engagement, some pieces of block bearings for forming a predetermined space between the inner race and the outer race, and a retainer fitted on the inner race for retaining the rollers, the springs and the block bearings (see, for example, Japanese Patent Application Laid-Open No. 2003-83365).

Figure 13:
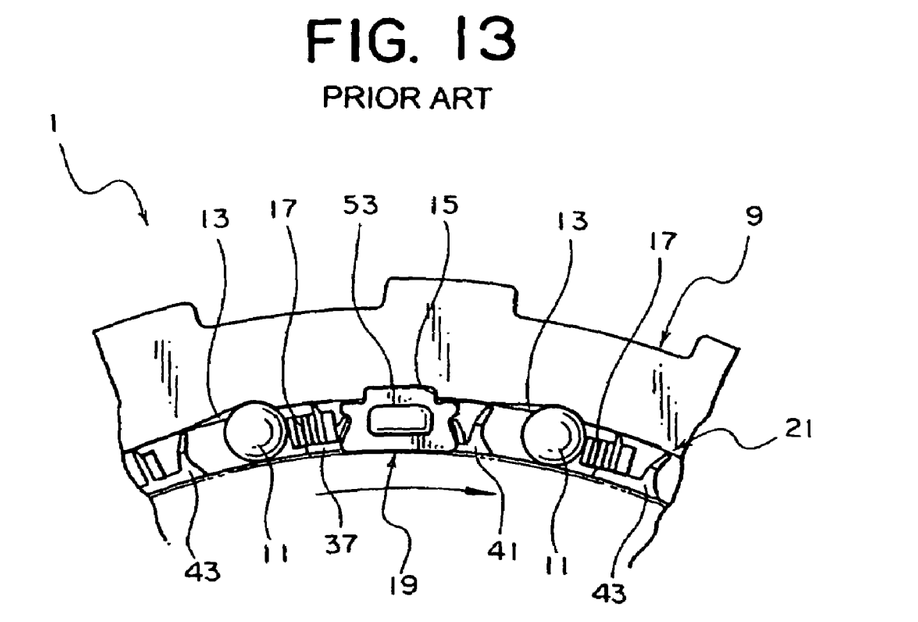
FIG. 13 is an enlarged view of the essential portion of a conventional one-way clutch apparatus.
Figure 14:
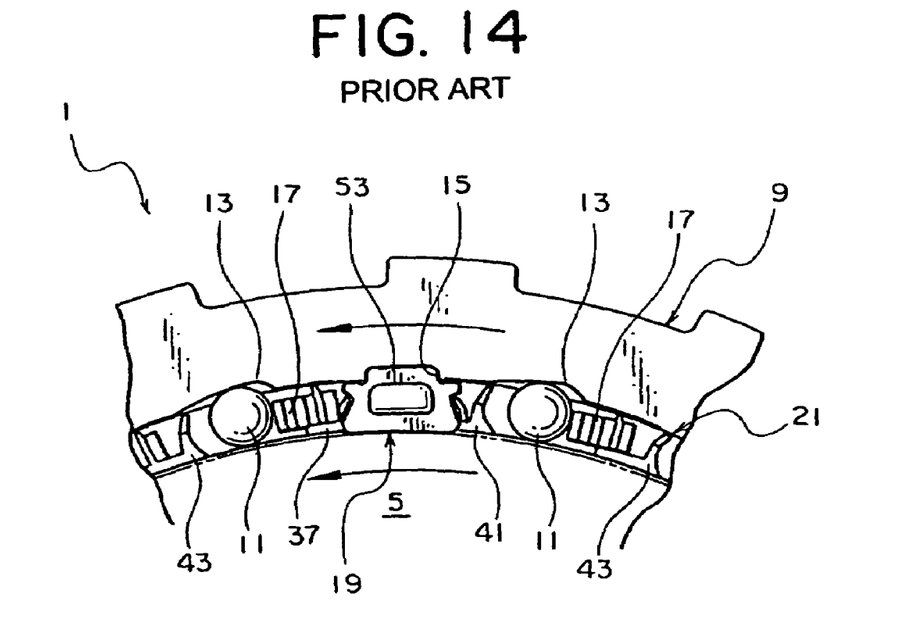
FIG. 14 is an enlarged view of the essential portion of the conventional one-way clutch apparatus.

In the roller type one-way clutch apparatus described above, there is a fear that the retainer may be damaged or broken when an excessive torque is inputted. FIGS. 13 and 14 are enlarged views for showing the essential portion of the conventional roller type one-way clutch apparatus. As shown in these drawings, the outer race 9 is formed with a retaining groove 15 in which a latch convex portion 53 projected on the outer peripheral surface of the block bearing 19 is fitted, in addition to the concave cams 13. The retainer 21 is provided with spring retaining columns 37 for retaining the respective accordion springs 17 and roller retaining columns 41, 43 for preventing the rollers 11 from falling off when the one-way clutch unit is conveyed (that is, prior to assembling thereof into the inner race 5), in addition to bearing latch pieces for retaining the block bearing 19.

Figure 15:
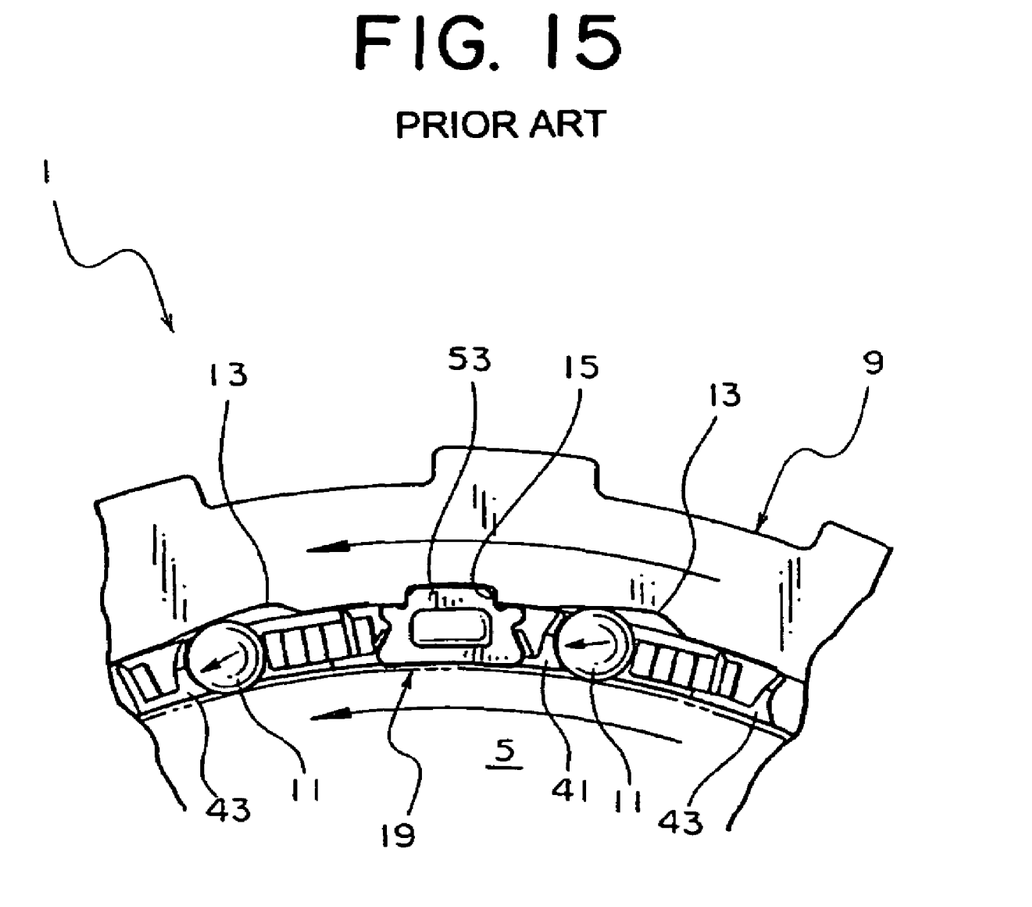
FIG. 15 is an enlarged view of the essential portion of the conventional one-way clutch apparatus.

In this one-way clutch apparatus, as shown in FIG. 13, since each roller 11 is moved to a non-engagement position of the concave cam 13 while compressing the accordion spring when the inner race 5 is rotated clockwise, torque transmission from the inner race 5 to the outer race 9 is not performed. On the other hand, when the inner race 5 is rotated counterclockwise, as shown in FIG. 14, each roller 11 advances to the side of an engagement position (a wedge space between the concave cam 13 and a cylindrical surface of the inner race 5) of the concave cam 13 so that torque transmission from the inner race 5 to the outer race 9 is performed. However, when an excessive torque is inputted from the inner race 5 to the outer race 9, as shown in FIG. 15, the roller 11 sometimes overruns the engagement position of the concave cam 13. In this case, the roller 11 runs into the roller retaining columns 41, 43 and, on this occasion, the roller retaining columns 41, 43 may be broken or broken pieces of the roller retaining columns 41, 43 may be mixed in the one-way clutch apparatus as foreign substances to cause malfunction. If an excessive torque is inputted, the roller 11 is, though intending to move to a shallower side of a cam surface 7, interrupted by the roller retaining columns 41, 43 so that a transmission torque can not be increased.

SUMMARY OF THE INVENTION

The present invention aims, in view of the above-described situation, of providing a one-way clutch apparatus which can prevent a retainer from being damaged or broken when an excessive torque is inputted.

In order to solve the above problem, according to a first aspect of the present invention, there is provided a one-way clutch apparatus comprising an inner race element having an outer peripheral surface on which either one of a concave cams and a cylindrical surface is formed, an outer race element having an inner peripheral surface on which the other of the concave cams and the cylindrical surface is formed, torque transmission members interposed between the concave cams and the cylindrical surface for performing torque transmission between the inner race element and the outer race element, biasing means for biasing the torque transmission members, a plurality of bearing members adapted to maintain a space between the inner race element and the outer race element, and a retainer mounted on the cam side element having the concave cams, for retaining the torque transmission members, the biasing means and the bearing members, characterized in that the retainer is rotatable in the circumferential direction relative to the cam side element.

Also, in the one-way clutch apparatus according to the first aspect of the present invention, it is preferable that each of the plurality of bearing members is a block bearing member which is retained by the cam side element and which has a sliding contact surface which is brought into sliding contact with the cylindrical surface.

Also, in the one-way clutch apparatus according to the first aspect of the present invention, it is preferable that, a circumferential retaining groove for retaining a corresponding bearing member is formed on the cam side element, and a radially projecting latch convex portion of the bearing member is fitted in the retaining groove and has a smaller circumferential width than that of the retaining groove.

Also, in the one-way clutch apparatus according to the first aspect of the present invention, it is preferable that the retainer is provided with a latch piece which is engaged with a circumferential side surface of a bearing member in order to prevent the bearing members from falling off in the radial direction.

Also, in the one-way clutch apparatus according to the first aspect of the present invention, it is preferable that the retainer is provided with a retaining column which is extended in the axial direction to retain the bearing member.

Also, in the one-way clutch apparatus according to the first aspect of the present invention, it is preferable that a circumferential width of a space formed between the retaining groove and the latch convex portion is larger than a lap width of the bearing retaining column with respect to the concave cam.

Also, in the one-way clutch apparatus according to the first aspect of the present invention, it is preferable that the biasing means is an accordion spring.

According to a second aspect of the present invention, there is provided a one-way clutch apparatus comprising an inner race with a cylindrical surface formed on the outer periphery thereof, an outer race with concave cams and retaining grooves formed on the inner periphery thereof, a retainer disposed between the inner race and the outer race, torque transmission rollers disposed at the positions corresponding to the concave cams on the retainer, accordion springs mounted on the retainer for biasing the torque transmission rollers in a direction of engagement inside the concave cams, and a plurality of block bearings each having a radially outwardly projecting convex portion fitted in a corresponding retaining groove formed on the outer race, for retaining a space between the inner race and the outer race, the convex portion having a smaller circumferential width than that of the retaining groove, the retainer being provided with a latch piece to be engaged with a circumferential side surface of the block bearing, characterized in that the retainer is rotatable in the circumferential direction relative to the outer race.

According to a third aspect of the present invention, there is provided a one-way clutch apparatus comprising an outer race with a cylindrical surface formed on the inner periphery thereof, an inner race with concave cams and circumferential retaining grooves formed on the outer periphery thereof, a retainer disposed between the inner race and the outer race, torque transmission rollers disposed at the positions corresponding to the concave cams on the retainer, accordion springs mounted on the retainer for biasing the torque transmission rollers in a direction of engagement inside the concave cams, and a plurality of block bearings each having a radially inwardly projecting convex portion fitted in a corresponding retaining groove formed on the inner race for retaining a space between the inner race and the outer race, the retainer being provided with a latch piece engaged with a circumferential side surface of the block bearing, characterized in that the retainer is rotatable in the circumferential direction relative to the inner race.

According to the present invention, since the retainer is rotatable in the circumferential direction relative to the cam side element, the retainer is hardly damaged or broken due to collision of the torque transmission members even when an excessive torque is inputted, and the maximum transmission torque can be increased.

DETAILED DESCRIPTION OF THE PREFERRED EMBODIMENTS

Figure 1:
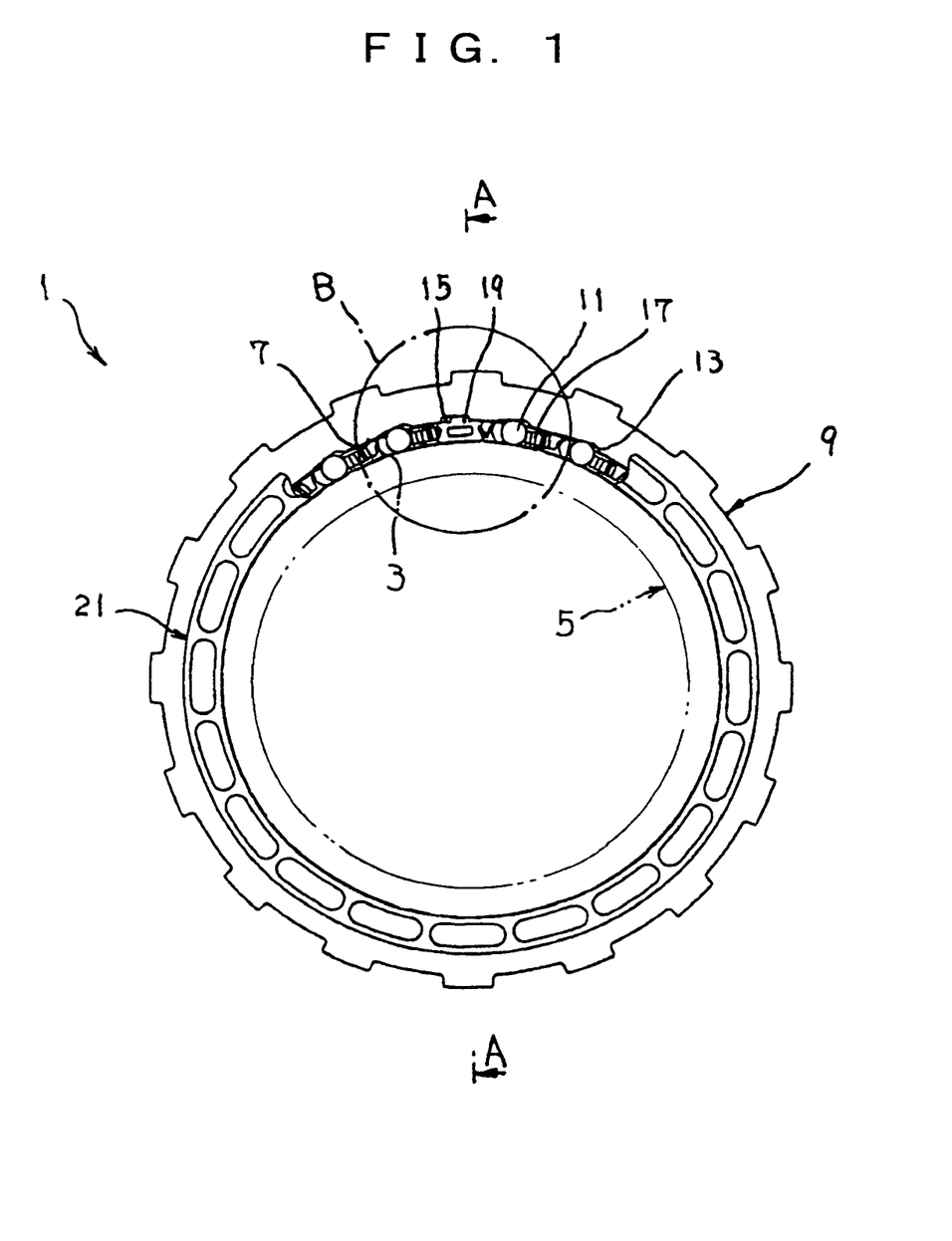
FIG. 1 is a front view showing an embodiment of a one-way clutch apparatus according to the present invention.
Figure 2:
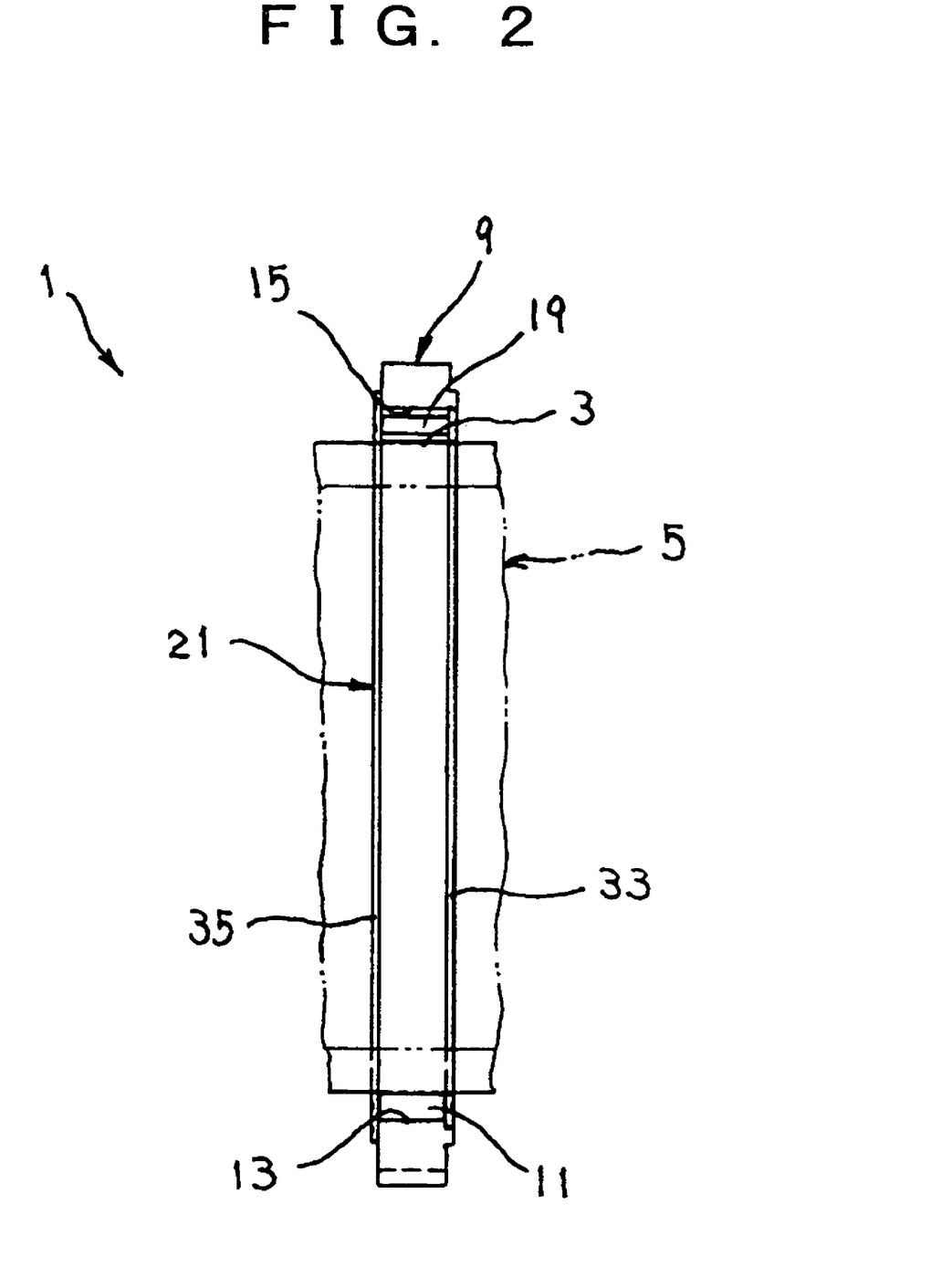
FIG. 2 is a cross-sectional view taken along line A—A in FIG. 1.
Figure 4:
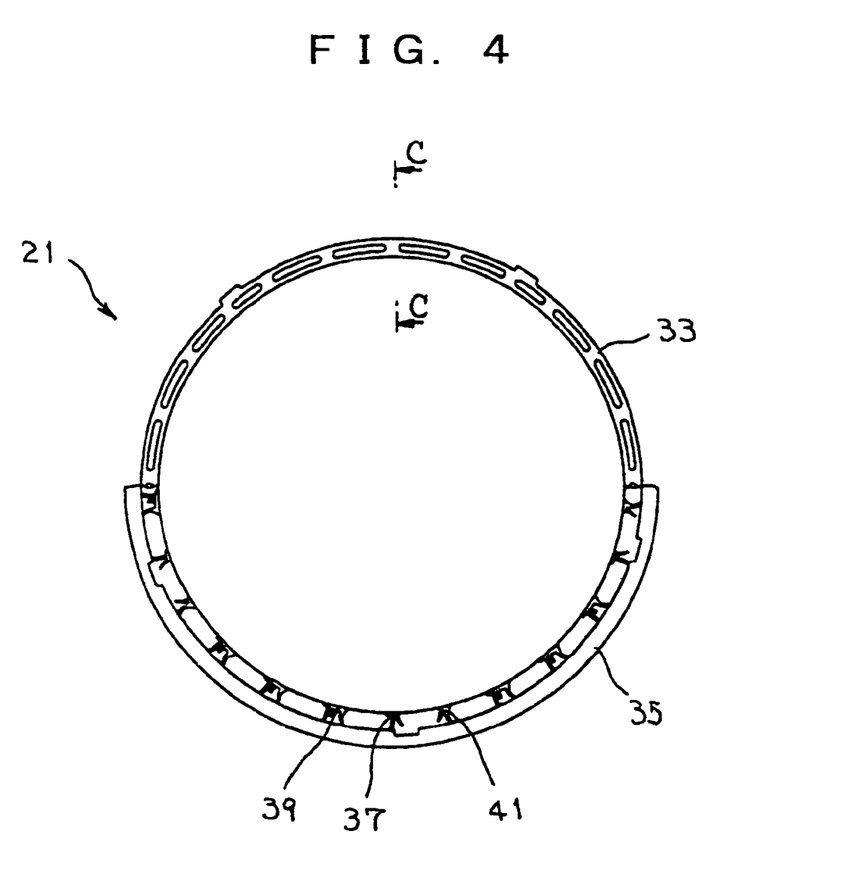
FIG. 4 is a front view of a retainer.
Figure 5:
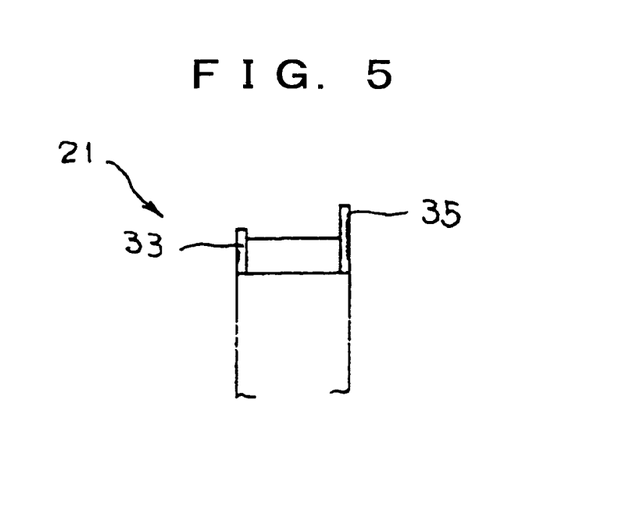
FIG. 5 is an enlarged cross-sectional view taken along line C—C in FIG. 4.

The present invention will be fully described below with reference to the drawings. FIG. 1 is front view showing the first embodiment of a one-way clutch apparatus according to the present invention which is incorporated in an automatic transmission of a car, FIG. 2 is a cross-sectional view taken along line A—A in FIG. 1, FIG. 3 is an enlarged view of a portion B in FIG. 1, FIG. 4 is a front view of a retainer which is used in the one-way clutch, and FIG. 5 is an enlarged cross-sectional view taken along line C—C in FIG. 4.

As shown in these drawings, the one-way clutch apparatus 1 of the first embodiment is comprised of an annular inner race 5 with the outer periphery formed as a cylindrical surface 3, an outer race (cam side element) 9 disposed to be rotatable coaxially with and relative to the inner race 5, a large number of torque transmission rollers 11 serving as torque transmission members interposed between the cylindrical surface 3 and an inner peripheral surface 7 of the outer race 9, and so on.

Figure 3:
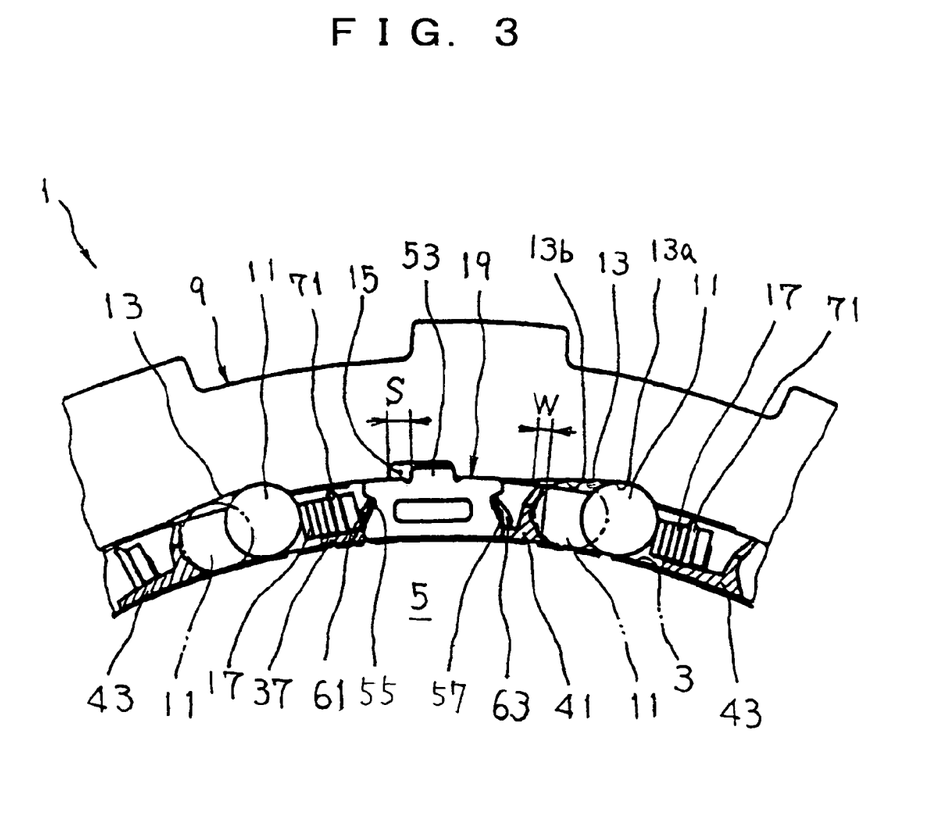
FIG. 3 is an enlarged view of a portion B in FIG. 1.

As shown in FIG. 3, on the inner peripheral surface 7 of the outer race 9, there are formed a plurality of concave cams 13 each consisting of a trough 13a and a slanting surface 13b formed along the circumferential direction and a plurality of circumferential retaining grooves 15 (only one of them is shown in the drawing) extending along the axial direction. Each of the rollers 11 is disposed between the cylindrical surface 3 and the concave cam 13, and is biased to the direction of engagement (that is, with respect to the slanting surface 13b) inside the concave cam 13 by the corresponding accordion spring 17.

Each of a plurality of block bearings 19 formed of oil impregnated sintered alloy is engaged with a corresponding retaining groove 15, and a space between the inner race 5 and the outer race 9 is maintained by these block bearings 19. As shown in FIGS. 1 and 2, a retainer 21 which is formed of synthetic resin such as nylon or polypropylene by injection molding retains the rollers 11, the accordion springs 17 and the block bearings 19 between the inner race 5 and the outer race 9. The retainer 21 has an integral structure, as shown in FIGS. 3, 4 and 5, of a small-diameter flange portion 33, a large-diameter flange portion 35, the spring retaining columns 37 for coupling both flange portions 33, 35 together and first and second roller retaining columns 41, 43.

The block bearing 19 has a cross-section in a substantially rectangular form and is formed, on an end surface 51 (FIG. 7) on the outer race 9 side with a radially outwardly projecting latch convex portion 53 which is fitted in the retaining groove 15 on the outer race 5, and its circumferentially side surfaces 55, 57 are tapered to expand toward the cylindrical surface 3. Block bearing latch pieces 61, 63 are respectively formed on the spring retaining column 37 and the first roller retaining column 41 of the retainer 21, and these bearing latch pieces 61, 63 are respectively engaged with circumferential side surfaces 55, 57 of the block bearing 19. See FIG. 3.

Figure 6:
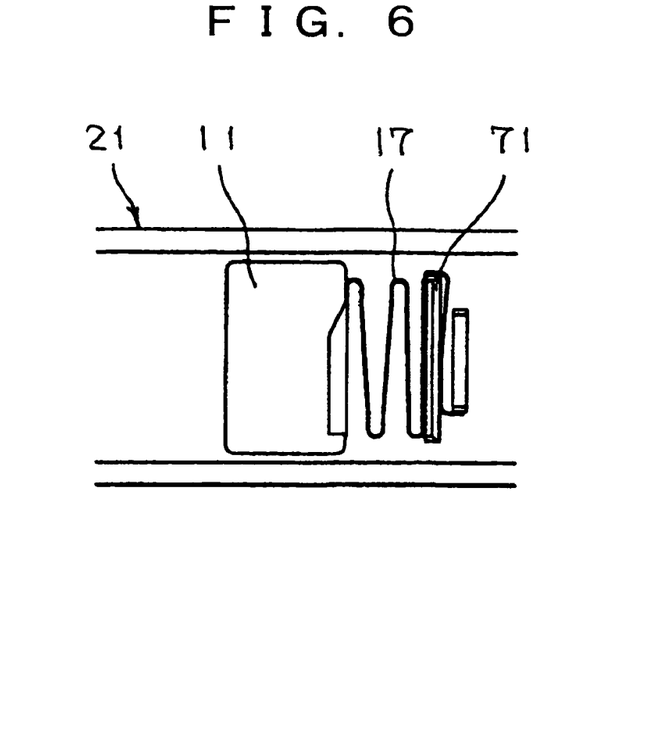
FIG. 6 is a plan view showing a latch portion of an accordion spring.

The spring retaining column 37 and the first roller retaining column 41 are respectively provided spring latch pieces 71 so that a fixed end of the accordion spring 17 is latched by and fixed to the spring latch piece 71, as shown in FIG. 6. The first and second roller retaining columns 41, 43 of the retainer 21, are formed respectively with roller retaining pieces 73 (FIG. 9) to be extended toward the outer race 9 for retaining the respective rollers 11. Accordingly, the retainer 21, the accordion springs 17, the block bearings 19 and the rollers 11 are mounted to the outer race 9 to constitute a sub assembly, and shipped or conveyed as a sub assembly to be mounted to the inner race 5 later.

In case of the first embodiment, the circumferential width of the latch convex portion 53 is set to be smaller than that of the retaining groove 15, so that a space S is produced between the latch convex portion 53 and the retaining groove 15 in the mounted state. This space S is larger than overlapping width W of the first or second roller column 41, 43 with the concave cam 13.

An operation of the first embodiment will be described in the following.

Figure 7:
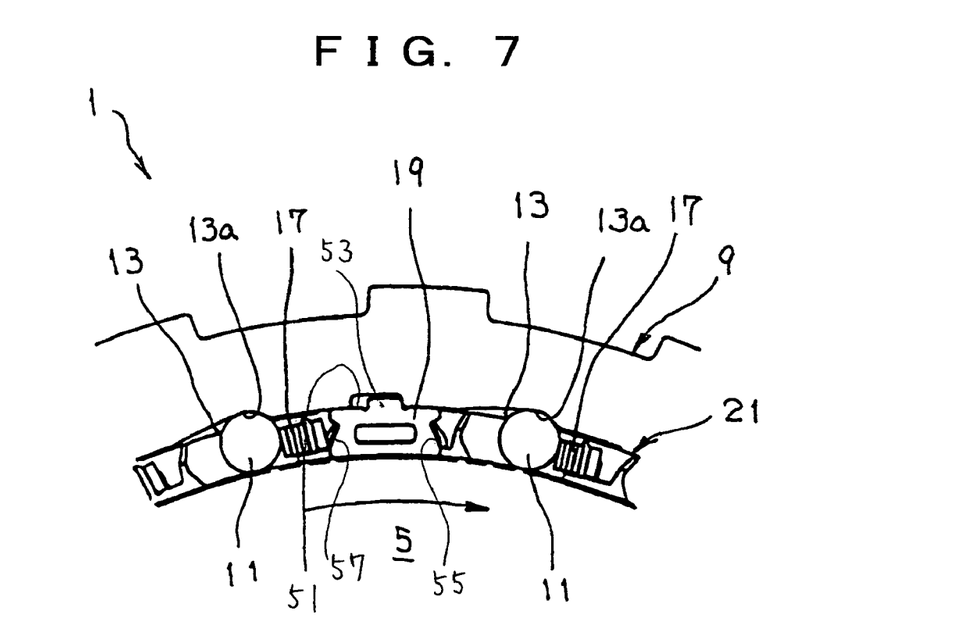
FIG. 7 is an explanatory view showing an operation of a first embodiment.
Figure 8:
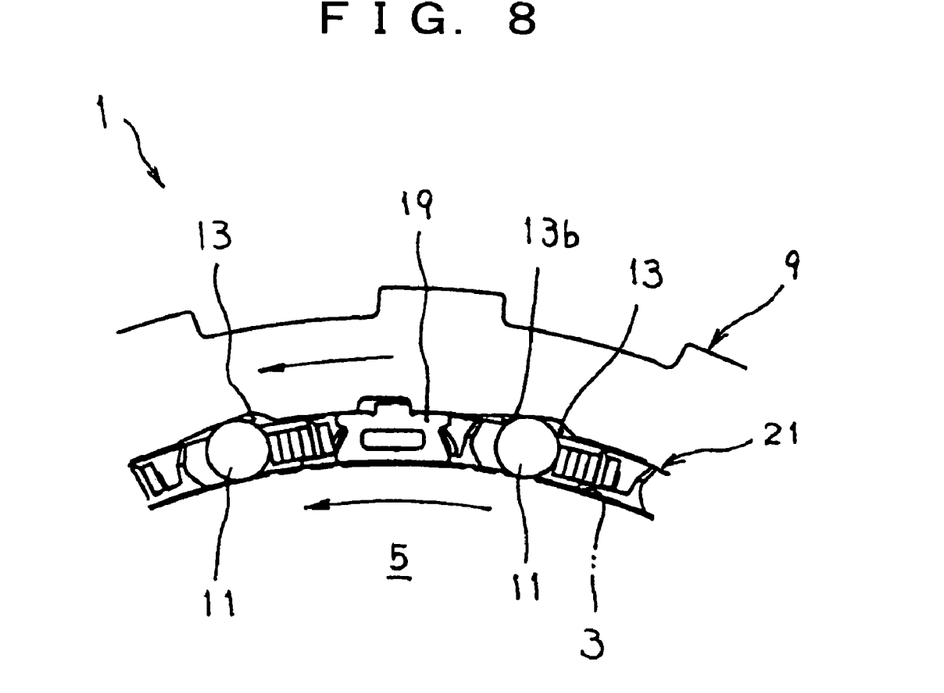
FIG. 8 is an explanatory view showing an operation of the first embodiment.

When an operation of the automatic transmission is started and the inner race 5 is rotated relative to the outer race 9 clockwise in FIG. 1, each roller 11 is fitted in the trough 13a of the concave cam 13 while compressing the accordion spring and the inner race 5 runs idle so that a torque is not transmitted to the outer race 9, as shown in FIG. 7. When the inner race 5 is rotated relative to the outer race 9 counterclockwise in FIG. 1, as shown in FIG. 8, each roller 11 advances to the side of the engagement position of the concave cam 13, that is, to a wedge space formed between the concave cam 13 and the cylindrical surface 3 of the inner race 5, thereby starting torque transmission from the inner race 5 to the outer race 9.

Figure 9:
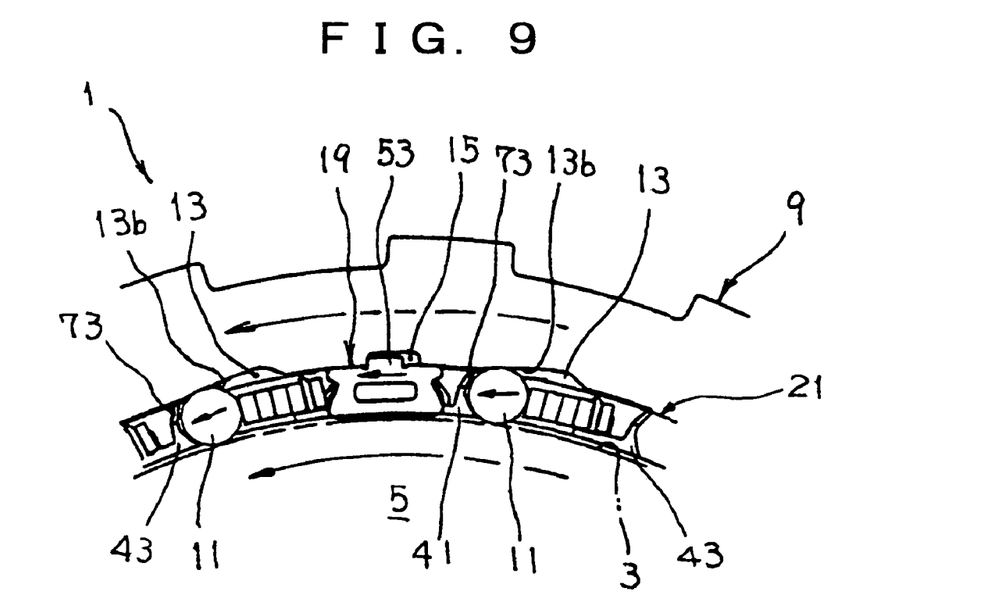
FIG. 9 is an explanatory view showing the operation of the first embodiment.

On the other hand, when an excessive torque is inputted to the outer race 9 from the inner race 5, as shown in FIG. 9, each roller 11 may overrun the engagement position of the concave cam 13, and the roller 11 may run into the first and second roller retaining columns 41, 43. However, in the first embodiment, since the circumferential width of the latch convex portion 53 of the block bearing 19 is set to be smaller than that of the retaining groove 15 of the outer race 9, when the first and second roller retaining columns 41, 43 are pressed by the roller 11, the latch convex portion 53 moves inside the retaining groove 15 and the block bearing 19 is rotated counterclockwise in FIG. 9 together with the retainer 21. With this rotation, large impact or stress does not work on the first and second roller retaining columns 41, 43 or the roller retaining piece 73. As a result, the first and second roller retaining columns 41, 43 or the roller retaining piece 73 is not damaged or broken, unlike in the conventional apparatus.

Figure 10:
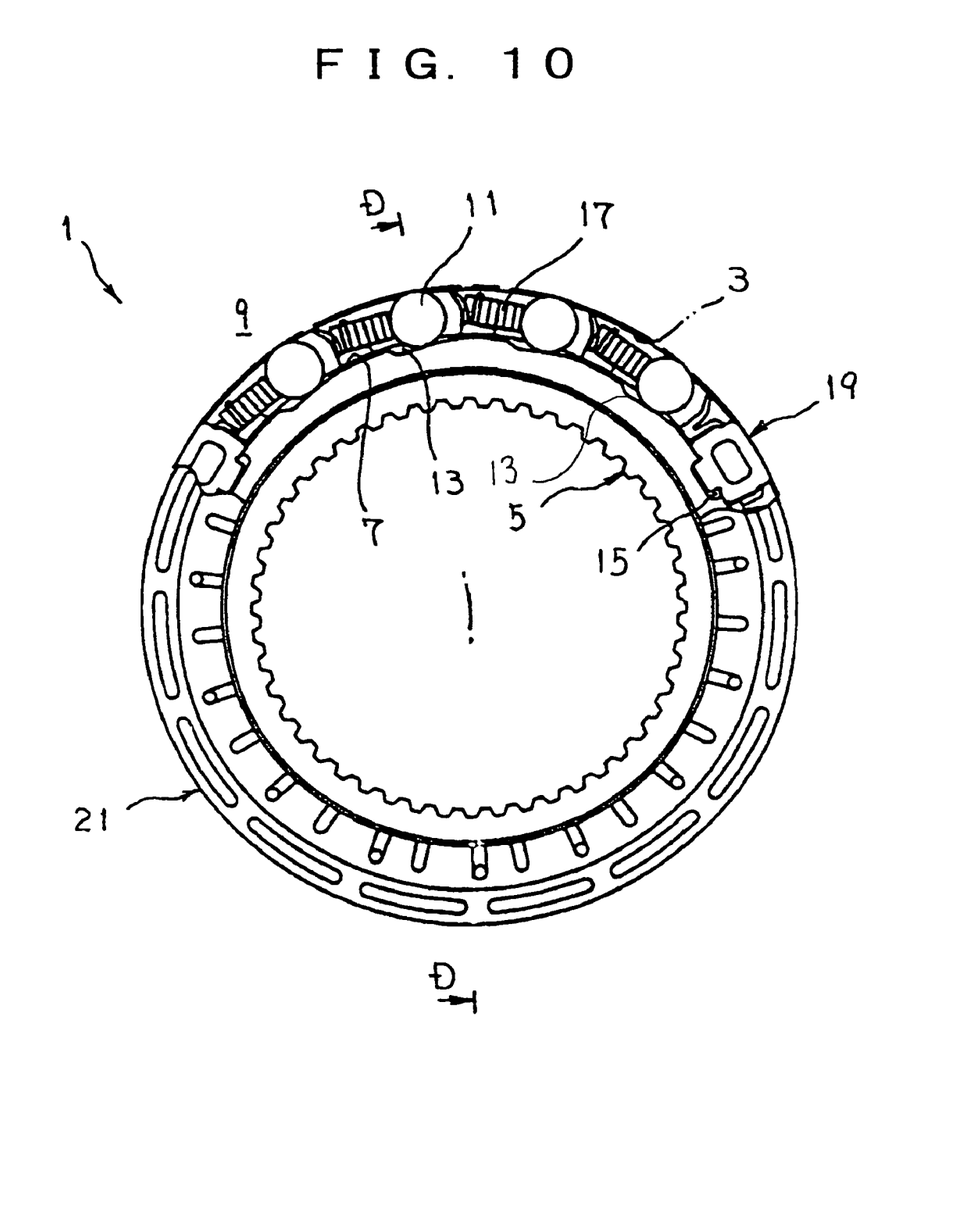
FIG. 10 is a front view showing a second embodiment of a one-way clutch apparatus according to the present invention.
Figure 11:
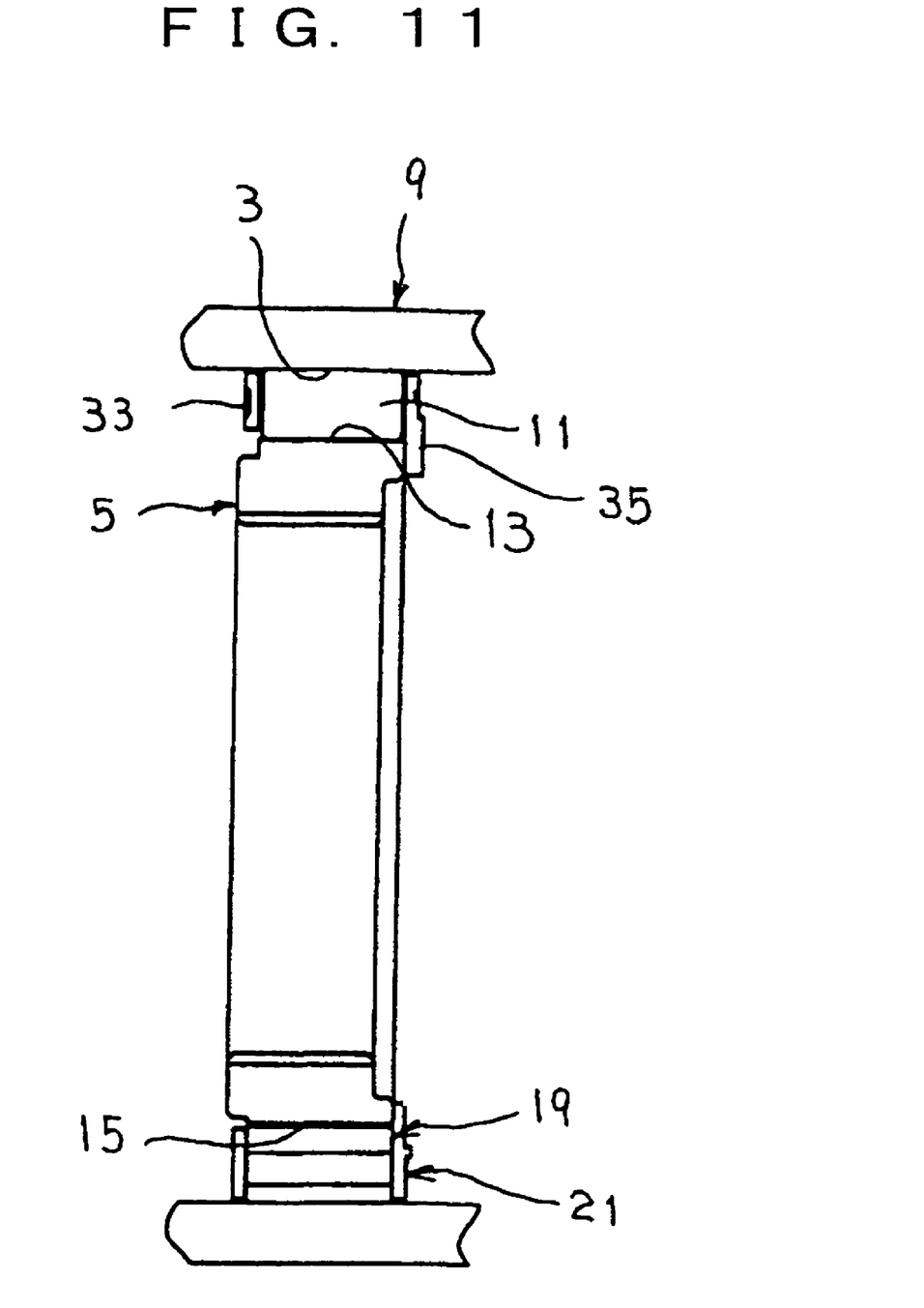
FIG. 11 is cross-sectional view taken along line D—D in FIG. 10.
Figure 12:
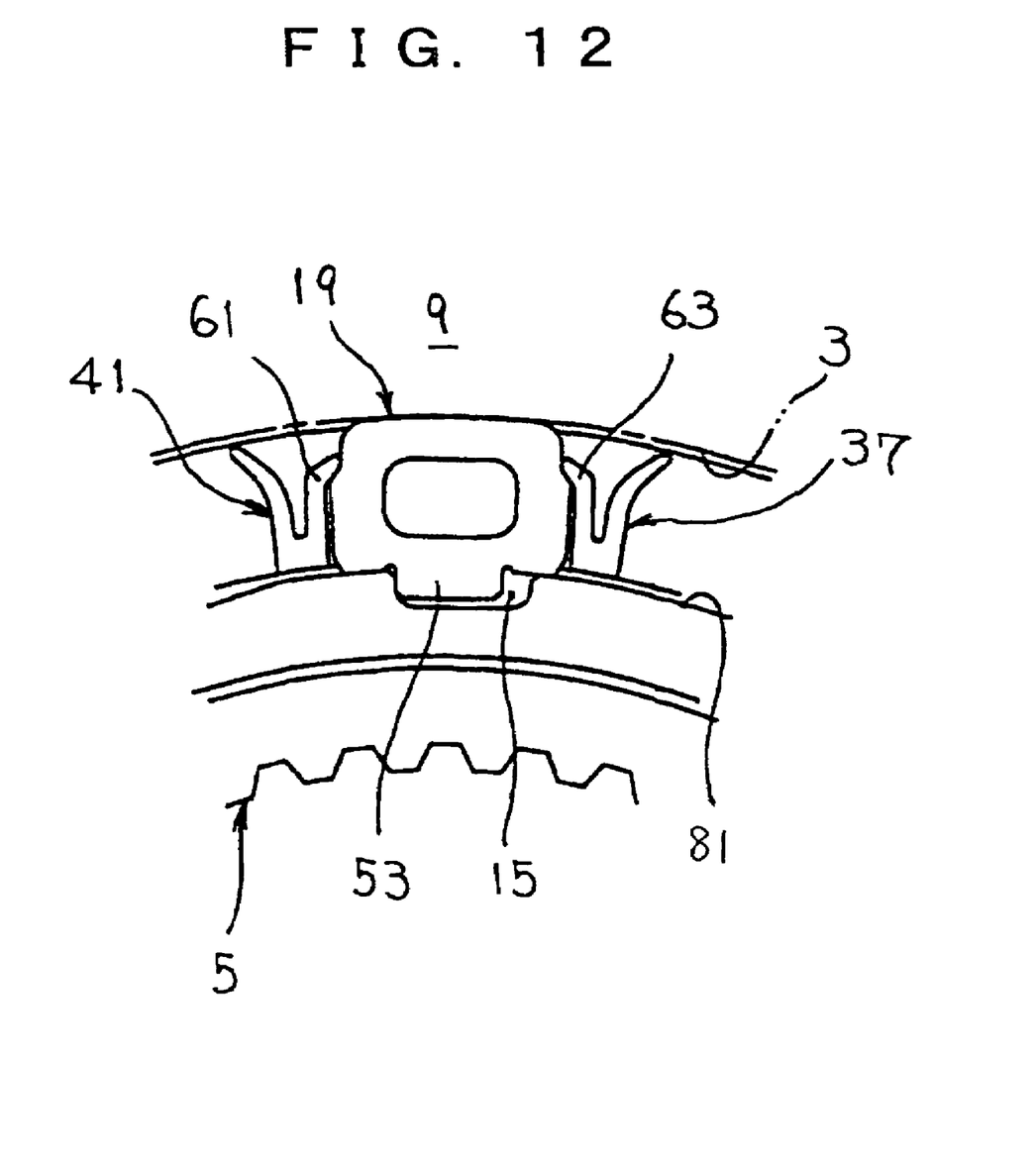
FIG. 12 is an enlarged view of the essential portion of the second embodiment.

FIG. 10 is a front view showing a second embodiment of a one-way clutch apparatus according to the present invention, FIG. 11 is cross-sectional view taken along line D—D in FIG. 10, and FIG. 12 is an enlarged view of the essential portion of the second embodiment. In the second embodiment, the concave cams 13 and the retaining grooves 15 are formed on the outer peripheral surface 81 of the inner race 5 and the cylindrical surface 3 is formed on the outer race 9. However, an operation of the second embodiment is the same as that of the first embodiment. Note that, in FIGS. 10 to 12, the members having the same functions as those in the first embodiment are given the same referential numbers.

Specific descriptions of the embodiments are as stated above. However, the present invention is not limited to these embodiments. For example, though cyrindrical rollers are used as the torque transmission members in the above embodiments, steel balls or the like may be used, instead of the rollers. Specific configurations, or the like, of the retainer or the inner and outer races are not limited to those described in the above embodiments, and may be properly altered for the convenience of the design.

What is claimed is:

1. A one-way clutch apparatus comprising an inner race element having an outer peripheral surface on which either one of a concave cam and a cylindrical surface is formed, an outer race element having an inner peripheral surface on which the other of the concave cam and the cylindrical surface is formed, torque transmission members interposed between said concave cams and said cylindrical surface for performing torque transmission between said inner race element and said outer race element, biasing means for biasing said torque transmission members, a plurality of bearing members adapted to maintain a space between said inner race element and said outer race element, and a retainer mounted on a cam side element having the concave cams, for retaining said torque transmission members, said biasing means and said bearing members, wherein said retainer is rotatable in a circumferential direction relative to said cam side element, wherein each of said plurality of bearing members is a block bearing member which is retained by said cam side element and has a sliding contact surface which is in sliding contact with said cylindrical surface, and wherein a circumferential retaining groove for retaining each said bearing member is formed on said cam side element, and a radially projecting latch convex portion of said bearing member is fitted in a corresponding retaining groove for circumferential movement therein and has a smaller circumferential width than that of said retaining groove.

2. A one-way clutch apparatus according to claim 1, wherein said retainer is provided with a latch piece which is engaged with a circumferential side surface of each said bearing member in order to prevent said bearing members from falling off in the radial direction.

3. A one-way clutch apparatus according to claim 1, wherein said retainer is provided with a retaining column which is extended in the axial direction to retain said bearing members.

4. A one-way clutch apparatus according to claim 3, wherein:
   a circumferential width of a space formed between said retaining groove and said latch convex portion is larger than an overlapping width of said bearing retaining column with said concave cam.

5. A one-way clutch apparatus according to claim 1, wherein said biasing means is an accordion spring.

6. A one-way clutch apparatus comprising an inner race with a cylindrical surface formed on the outer periphery thereof, an outer race with concave cams and circumferential retaining grooves formed on the inner periphery thereof, a retainer disposed between said inner race and said outer race, torque transmission rollers disposed at the positions corresponding to said concave cams on said retainer, accordion springs mounted on said retainer for biasing said torque transmission rollers in a direction of engagement inside said concave cams, and a plurality of block bearings each having a radially outwardly projecting engagement convex portion fitted in a corresponding retaining groove formed on said outer race for circumferential movement therein, and having smaller circumferential width than that of said retaining groove, for retaining a space between said inner race and said outer race, said retainer being provided with a latch piece engaged with a circumferential side surface of said block bearing,     wherein said retainer is rotatable in a circumferential direction relative to said outer race.

7. A one-way clutch apparatus comprising an outer race with a cylindrical surface formed on the inner periphery thereof, an inner race with concave cams and circumferential retaining grooves formed on the outer periphery thereof, a retainer disposed between said inner race and said outer race, torque transmission rollers disposed at the positions corresponding to said concave cams on said retainer, accordion springs mounted on said retainer for biasing said torque transmission rollers in a direction of engagement inside said concave cams, and a plurality of block bearings each having a radially inwardly projecting engagement convex portion fitted in a corresponding retaining groove formed on said inner race for circumferential movement therein, and having smaller circumferential width than that of said retaining groove, for retaining a space between said inner race and said outer race, said retainer being provided with a latch piece engaged with a circumferential side surface of each said block bearing,     wherein said retainer is rotatable in a circumferential direction relative to said inner race.

8. A sub assembly to be assembled in an inner race with a cylindrical surface formed on the outer periphery thereof for constituting a one-way clutch, comprising an outer race with concave cams and circumferential retaining grooves formed on the inner periphery thereof, a retainer disposed between said inner race and said outer race, torque transmission rollers disposed at the positions corresponding to said concave cams on said retainer, accordion springs mounted on said retainer for biasing said torque transmission rollers in a direction of engagement inside said concave cams, and a plurality of block bearings each having a radially outwardly projecting latch convex portion fitted in a corresponding retaining groove formed on said outer race for circumferential movement therein, for retaining a space between said inner race and said outer race when said sub assembly is assembled in said inner race,     wherein said retainer is provided with a latch piece engaged with a circumferential side surface of each said block bearing, and said retainer is rotatable in a circumferential direction relative to said outer race.

\* \* \* \* \*